Aug. 5, 1924.
E. E. HAUER
STRAINER
Filed Jan. 10, 1923   2 Sheets-Sheet 1
1,503,584
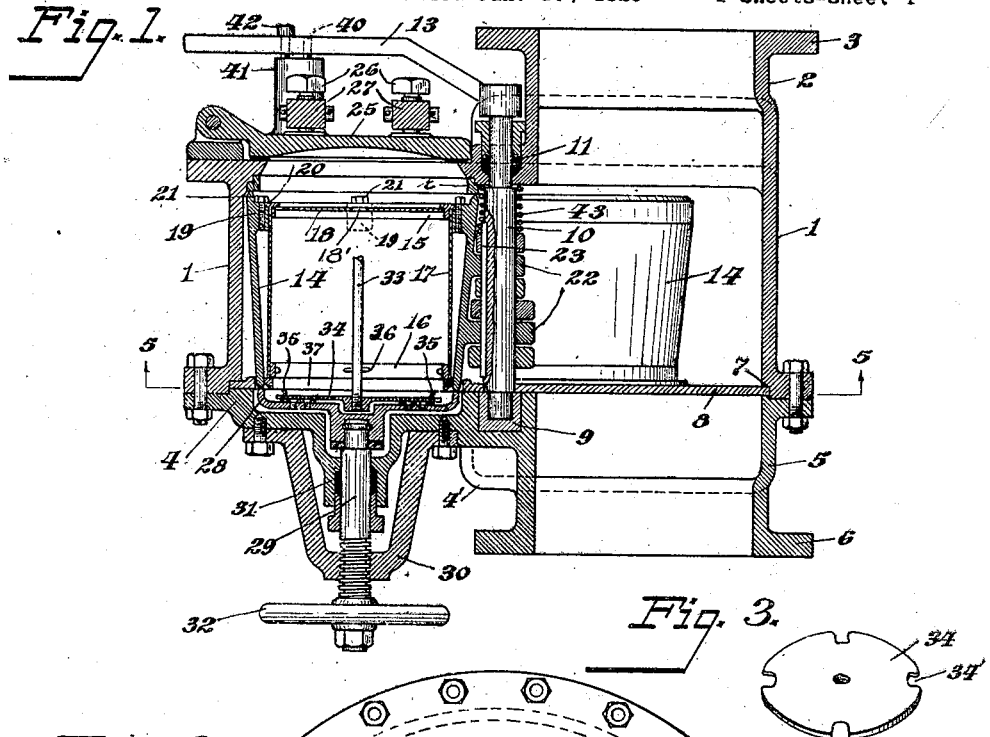
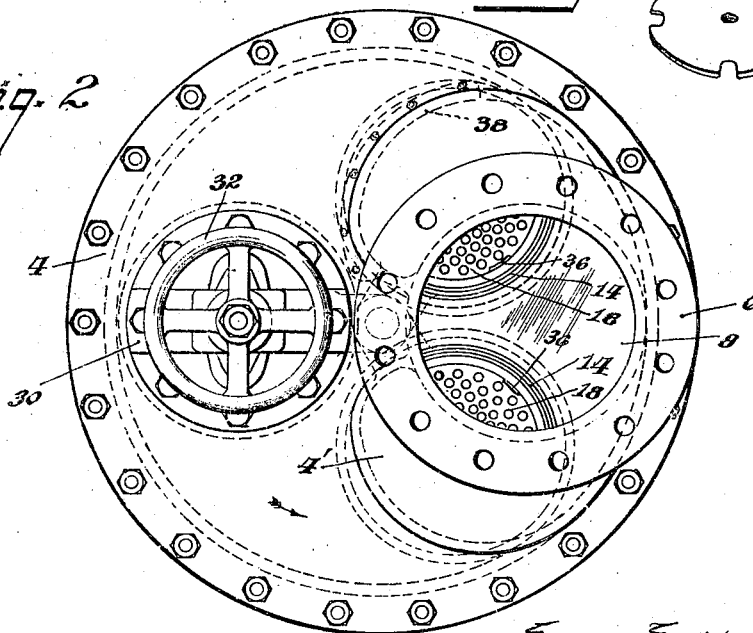

Aug. 5, 1924.

E. E. HAUER

STRAINER

Filed Jan. 10, 1923  2 Sheets-Sheet 2

Inventor
Elmer E. Hauer

By
Attorneys

Patented Aug. 5, 1924.

1,503,584

UNITED STATES PATENT OFFICE.

ELMER E. HAUER, OF SPRINGFIELD, OHIO.

STRAINER.

Application filed January 10, 1923. Serial No. 611,704.

*To all whom it may concern:*

Be it known that I, ELMER E. HAUER, a citizen of the United States, residing at Springfield, in the county of Clark and State of Ohio, have invented certain new and useful Improvements in Strainers, of which the following is a specification.

My invention relates to improvements in strainers for straining liquid. It particularly relates to that type of strainer which has a plurality of straining elements and a cleaning chamber so arranged that one of the straining elements may be cleaned without interrupting the flow of liquid through the apparatus.

One of the objects of the invention is to devise a strainer of the character referred to in which a plurality of straining elements are located in the line of flow of the liquid to increase the straining area over the area of the supply and exhaust pipes and thereby insure a free flow of the liquid through the apparatus.

A further object of my invention is to provide a straining apparatus having a plurality of straining elements in which but a single cleaning chamber is employed, together with means for locating the straining elements successively in the cleaning chamber without disturbing the flow of liquid.

A further object of my invention is to provide means for cutting or disintegrating sticks and other foreign substances found in dirty water and which become clogged in the open end of the straining basket to an extent which would prevent the movement of the elements from straining position to cleaning position.

A further object of the invention is to improve the form and construction of the straining elements.

A further object of the invention is to provide improved means for removing the straining elements from the cleaning chamber.

A further object of the invention is to provide an improved construction for closing the space between the outer walls of the straining elements and the inner wall of the main casing for the purpose of insuring that all of the liquid will be directed through said straining elements.

A further object of the invention is to devise a strainer of this character which is simple in construction, effective in operation and economical in manufacture.

Further objects of the invention will appear from the accompanying drawings, description and claims.

In the accompanying drawings:

Fig. 1 is a vertical section of an apparatus embodying the improvements.

Fig. 2 is an elevation of the lower end of the same.

Fig. 3 is a perspective view of the closure for the lower end of the straining baskets when removed from the cleaning chamber.

Figure 4:
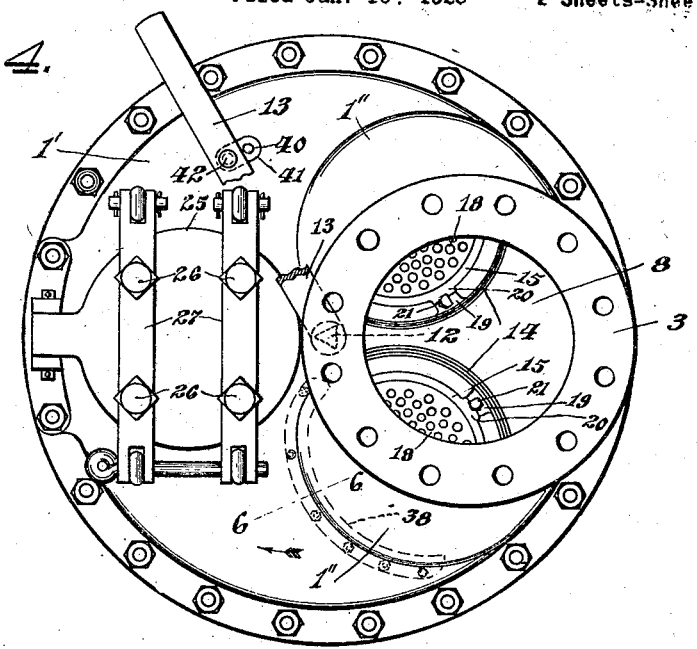
Fig. 4 is an elevation of the upper end of the apparatus.
Figure 5:
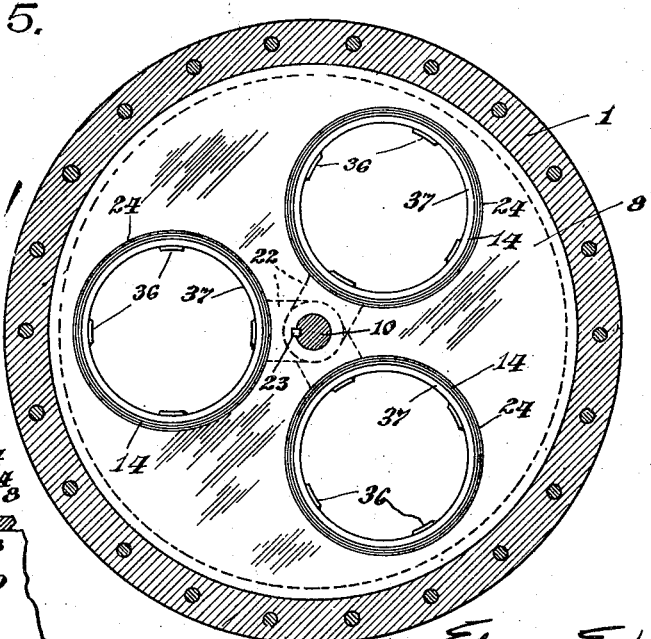
Fig. 5 is a section on the line 5—5 of Fig. 1.

Referring to the drawings, 1 represents a main cylindrically formed casing having an integrally formed upper head 1' which has at one side of the center thereof an integrally formed extension 2 provided with a flange 3 to which the outlet pipe (not shown) for the liquid is connected. Bolted to the lower end of the main casing 1 is a head 4 having an extension 5 in line with the extension 2 and provided with an outer flange 6 to which the inlet pipe (not shown) for the liquid is connected, this inlet pipe in the present case forming the means for supporting the apparatus. The opposite side of the casing forms a cleaning chamber in which is located the straining element to be cleaned. The lower end of the main casing 1 is provided with an annular recess as indicated at 7 to receive a circular plate 8 which finds a seat upon the upper side of the head in a manner to permit it to rotate thereon. The head 4 has a centrally-arranged recess to receive a bushing 9 into which is stepped the reduced lower end of a shaft 10, the upper end of the shaft being also reduced and projected through a stuffing box 11 in the head 1'; the extreme upper end of the reduced portion of the shaft 10 being triangled, in the present case, as indicated at 12 in Fig. 4, to receive an operating lever 13 by which the shaft may be rotated.

In the present case three straining elements are employed, although the apparatus is applicable to the use of more than three of these elements if desired. Each straining element consists of a conduit 14 open at both ends and flaring in the direction of flow of the liquid, which has supported therein a straining basket consisting of an upper ring 15, a lower ring 16, side walls 17 of perforated sheet metal suitably secured to the respective rings, and a perforated metal disk 18 secured to the upper ring 15. The conduit 14 has at its upper end a plurality of rearwardly projecting lugs 19 which form shelves upon which the ring 18 is hung, this ring being provided with lugs 20 for the purpose. A series of screws 21 are threaded in the lugs 19 with the heads overlying the lugs 20 of the ring so as to hold the basket in position. Each conduit has a pair of arms 22 which are sleeved on the shaft 10 and splined thereto by the key 23 so that the conduits and their baskets will be supported by and revolve with the shaft.

The lower edge of each conduit 14 is snugly fitted in an opening 24 in the plate 8 so that when the conduits are revolved the plate 8 revolves therewith, this plate 8 being intended for the purpose of closing the space between the conduits and the interior of the main casing 1. When the parts are in position for operation with one of the conduits in the cleaning chamber, it will be seen that the other two conduits will be in a position to receive the flow from the inlet pipe so that one-half of the liquid will pass through one conduit and the other half through another conduit, thus materially increasing the straining area over the area of the inlet and outlet pipes inasmuch as each conduit has a capacity nearly as great as the capacity of said pipes. In order that each conduit which is in commission may receive an unobstructed flow of liquid from the inlet pipe, the head 4 is provided with enlargements 4' which communicate with the extension 5 and are located in line with those conduits which are in commission, and the head 1' is formed with similiar enlargements 1" to permit the free escape of the liquid through the outlet 2. Each conduit is shown as flaring from the inlet to outlet end thereof, the area of the outlet end of the conduit being substantially twice the area of the inlet end of the basket. This is for the purpose of permitting the liquid to flow through the side walls of the basket and escape about the lugs 19 and 20 as soon as the disk 18 becomes clogged. Each set of these lugs is preferably four in number so as to leave ample space for the flow of the liquid. The cleaning chamber has its upper end normally closed by a lid 25, which is locked to position by the set-screws 26 threaded in the hinged bars 27. When a straining element has been moved to the straining chamber, the lower end of the conduit 14 of that element is closed by a swivelled plate 28 having an upturned annular flange which seats against the lower edge of the conduit. The plate is forced to position by a screw 29 threaded in a bridge 30 and passing through a stuffing box 31 in the head 4 with its ends swivelly connected with the plate 28; the screw being provided with a hand wheel 32 by which it may be turned to position. This operation also forces the upper edge of the conduit against a packing ring r.

When one of the baskets of a straining element is to be removed the upper end of the cleaning member is opened by unfastening and throwing back the lid 25. A rod 33 is then inserted in the chamber by passing it through a small opening 18' in the disk 18 and screwed into a central threaded aperture of a disk 34 which normally lies on the plate 28, being yieldingly held in position by a series of spring fingers 35, which are secured to the plate 28 and fit into a series of notches 34' in the plate 34 (Fig. 3). The disk 34 is then lifted by the rod 33 until the edge of the plate 34 contacts a series of lugs 36 on the interior of the ring 16 whereupon the straining basket may be lifted from its conduit, it being understood of course that the screws 19 are first removed. While the rod 33 is for the sake of illustration shown secured to the plate 34 in Fig. 1, it will be understood that this rod 33 is not normally in this position and is only secured to the plate for the purposes of removing the straining basket after the lid 25 has been removed.

Figure 6:
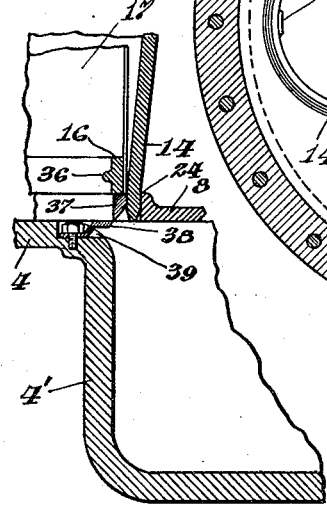
Fig. 6 is a vertical section of some of the parts which appear on the line 6—6 of Fig. 4.

In order to cut and disintegrate the sticks or other foreign substance which find their way into the straining elements so as to prevent such sticks or other substances from interrupting the free rotation of the straining elements, I provide each conduit with a circular cutting knife 37 which is secured to the lower end of the conduit just beneath the ring 16 of the basket with its cutting edge extending substantially flush with the lower edge of the conduit. Cooperating with these circular cutting knives 37 is a curved knife blade 38 (see Fig. 6 for detail) which is secured in a recess 39 in the head 4 at a point along the upper edge of one of the enlargements 4' thereof; that edge of the enlargement to which the knife is secured being the one which is the closest to the cleaning chamber considering the direction of rotation of the straining elements so that when the straining elements are rotated from one position to the other the circular cutting knife 37 of one of the straining elements will cooperate with the knife 38 with a shearing action to cut or disintegrate any sticks or other foreign substances which may be protruding from the open end of the basket.

While the apparatus in the present case is shown set vertically, it is sometimes installed in a horizontal position. In order to prevent undue friction between the discharge ends of the conduits and the sealing rings *r* when the apparatus is in horizontal position, as the conduits are revolved from one position to another, I insert between the head 1' and an arm 22, a coil spring 43, placed about the shaft 10, which spring serves to normally press the conduits away from the ring *r*, but yields to permit the discharge end of that conduit which is in the cleaning chamber to be forced against the ring *r* in the manner before described.

In operation, when it is desired to clean one of the straining elements which has been in commission, the lever 13 is removed from the upper end of the shaft 10 and again attached thereto in the position indicated by dotted lines in Fig. 4. The shaft 10 is then revolved clockwise in a clockwise direction until the lever strikes a stop-pin 40 projecting from a boss 41 on the upper end of the casing 1, which correctly positions the baskets, two in the line of flow and one in the cleaning chamber. The lever is locked in this position by a pin 42 which is inserted through an aperture in the lever into an opening in the boss 41, thus locking the straining elements. The plate 28 is then clamped to the lower edge of the conduit in the cleaning chamber.

Having thus described my invention, I claim:

1. In a straining apparatus, a main casing, a shaft extending through said casing and supported at each end thereby, means for rotating said shaft, a plurality of independent conduits each independently connected with and supported by said shaft between the ends thereof so as to be rotated thereby, and a movable straining element in each conduit, said casing having inlet and outlet openings for liquid and a third opening to permit removal of said straining elements.

2. In a straining apparatus, a main casing, a shaft extending through said casing and having each end thereof journaled therein, means for rotating said shaft, a plurality of conduits, each conduit being secured to the shaft by a pair of arms, a removable straining element in each conduit, said casing having inlet and outlet openings for the liquid and a third opening to permit removal of said straining elements.

3. In a straining apparatus, a main casing, a shaft journaled therein together with means for rotating the same through a predetermined distance, a plurality of more than two open-ended conduits carried by said shaft, a straining element in each conduit, said casing having inlet and outlet openings for the liquid and a third opening to permit removal of the straining elements, said conduits being so positioned as to have a single conduit in registry with said third opening and a plurality of conduits in communication with said inlet and outlet openings, with their longitudinal axes substantially parallel with the line of flow.

4. In a straining apparatus, a main casing, a plurality of more than two open-ended conduits rotatably mounted in said casing, a straining element in each conduit, said casing having inlet and outlet openings on one side of the center thereof for the liquid and a third opening on the opposite side of the center thereof to permit removal of the straining elements, said conduits capable of being so positioned as to have a single conduit in registry with said third opening, and a plurality of conduits in communication with said inlet and outlet openings, with their longitudinal axes substantially parallel with the line of flow and means for closing the ends of the conduit which is in registry with said third opening.

5. In a straining apparatus, a main casing, a plurality of more than two open-ended conduits mounted in said casing, a straining element in each conduit, said casing having inlet and outlet openings for the liquid and a third opening to permit removal of the straining elements, a member rotatably mounted with said conduits to close the space between the conduits and the interior of the casing, said conduit being so positioned as to have a single conduit in registry with the last-mentioned opening, and a plurality of conduits in communication with said inlet and outlet openings.

6. In a straining apparatus, a main casing, a plurality of open-ended conduits rotatably mounted in said casing, a rotatable member having a plurality of openings, one for each conduit, in which the inlet ends of said conduits extend, said rotatable member being constructed as to close the space between said conduits and the interior of said casing, and means for rotating said conduits throughout a predetermined distance to bring a plurality of said conduits in registry with said inlet and outlet openings and another conduit in registry with said third opening, and means for closing the ends of said last-mentioned conduit.

7. In a straining apparatus, a cylindrical casing, a plurality of more than two conduits revolubly mounted in said casing, and a circular plate supported by the walls of said casing and having openings which communicate with the inlet ends of said conduits, said casing having aligned inlet and outlet openings for the liquid and also a third opening to permit removal of the straining elements, and means for positioning the conduits so as to have a plurality of the same in registry with said inlet and outlet openings and another conduit in registry with said third opening.

8. In a straining apparatus, a main casing, a straining element movably mounted in said casing, said element having an open inlet end, a movable plate normally supported in proximity to the inlet end of said straining element, an opening in said casing to permit removal of said straining element therefrom, and an insertable element together with means for attaching the same to said plate to remove the plate from said casing, and inter-engaging parts between said plate and straining element whereby the straining element will be removed with said plate.

9. In a straining apparatus, a main casing, a conduit movably supported in said casing, said casing having an opening with which said conduit is arranged to be brought in registry, a removable straining element in the form of a basket in said conduit open at its inlet end, a movable plate supported in proximity to the open end of said basket when said element has been brought in registry with said opening, an insertable rod together with means for engaging one end of same with said plate to remove the plate through said opening, and inter-engaging parts between said plate and said basket whereby said basket will be removed when said plate is removed, said plate acting also to close the open end of said basket.

10. In a straining apparatus, a main casing, a conduit movably mounted in said casing, said casing being provided with inlet and outlet openings for the liquid and with a compartment into which said straining element may be moved for cleaning purposes, a cutter carried by said straining element, and another cutter carried by said casing whereby when the said straining element is moved from straining position to cleaning position, said cutters coact to cut or disintegrate protruding matter carried by said straining element.

11. In a straining apparatus, a main casing, a conduit therein movable from one position to another, a fixed member against which one end of said conduit is clamped when in one position and in proximity to which the same passes when being moved from one position to another, and a spring normally tending to hold the end of said conduit away from said fixed member.

12. In a straining apparatus, a conduit, said conduit being flared from the inlet toward the outlet end thereof, and a straining element supported from the large end of said conduit, there being a space between said straining element and the inner wall of said conduit to permit liquid to filter through the side walls of the straining element and escape from the open end of the conduit, for the purpose specified.

In testimony whereof, I have hereunto set my hand this 6th day of January 1923.

ELMER E. HAUER.